Sept. 3, 1929.  E. O. YEAGER ET AL  1,727,263
MULTIPLE DISK TYPE TALKING MACHINE
Filed April 24, 1925  3 Sheets-Sheet 1

Inventors
E. O. Yeager
R. H. York
By Marks Clerk
Attys

Sept. 3, 1929.    E. O. YEAGER ET AL    1,727,263
MULTIPLE DISK TYPE TALKING MACHINE
Filed April 24, 1925    3 Sheets-Sheet 2
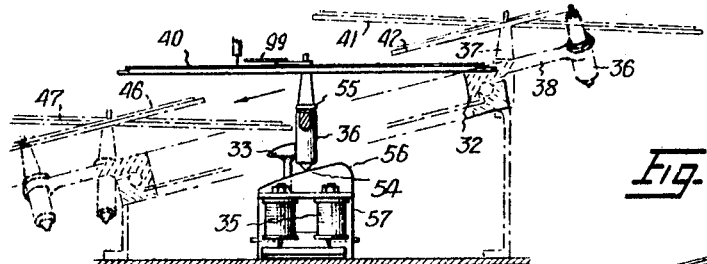
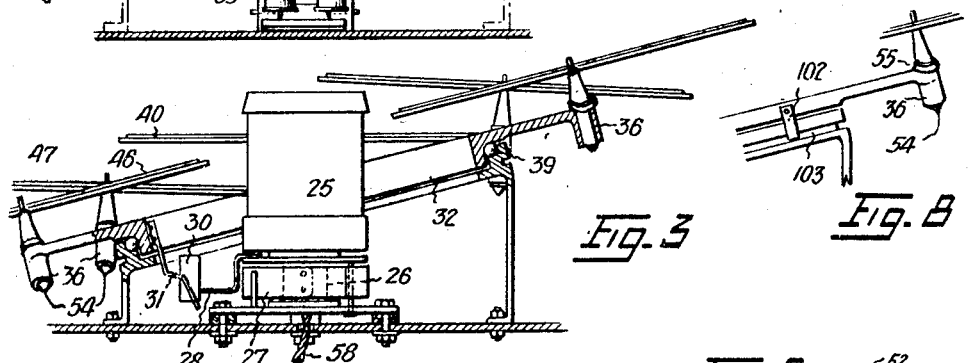
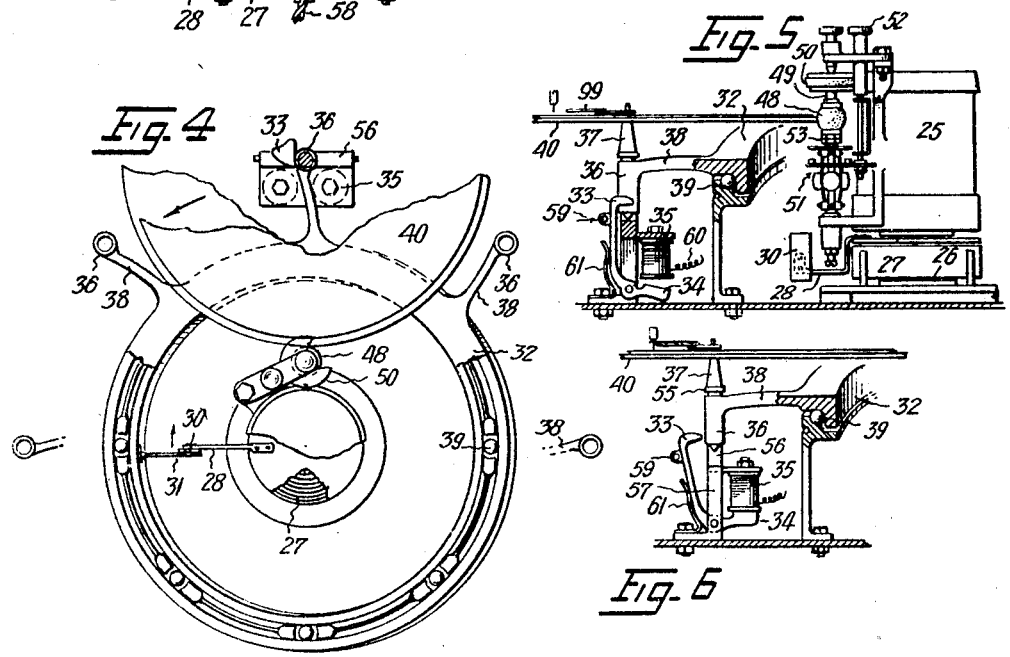

Sept. 3, 1929.  E. O. YEAGER ET AL  1,727,263
MULTIPLE DISK TYPE TALKING MACHINE
Filed April 24, 1925   3 Sheets-Sheet 3
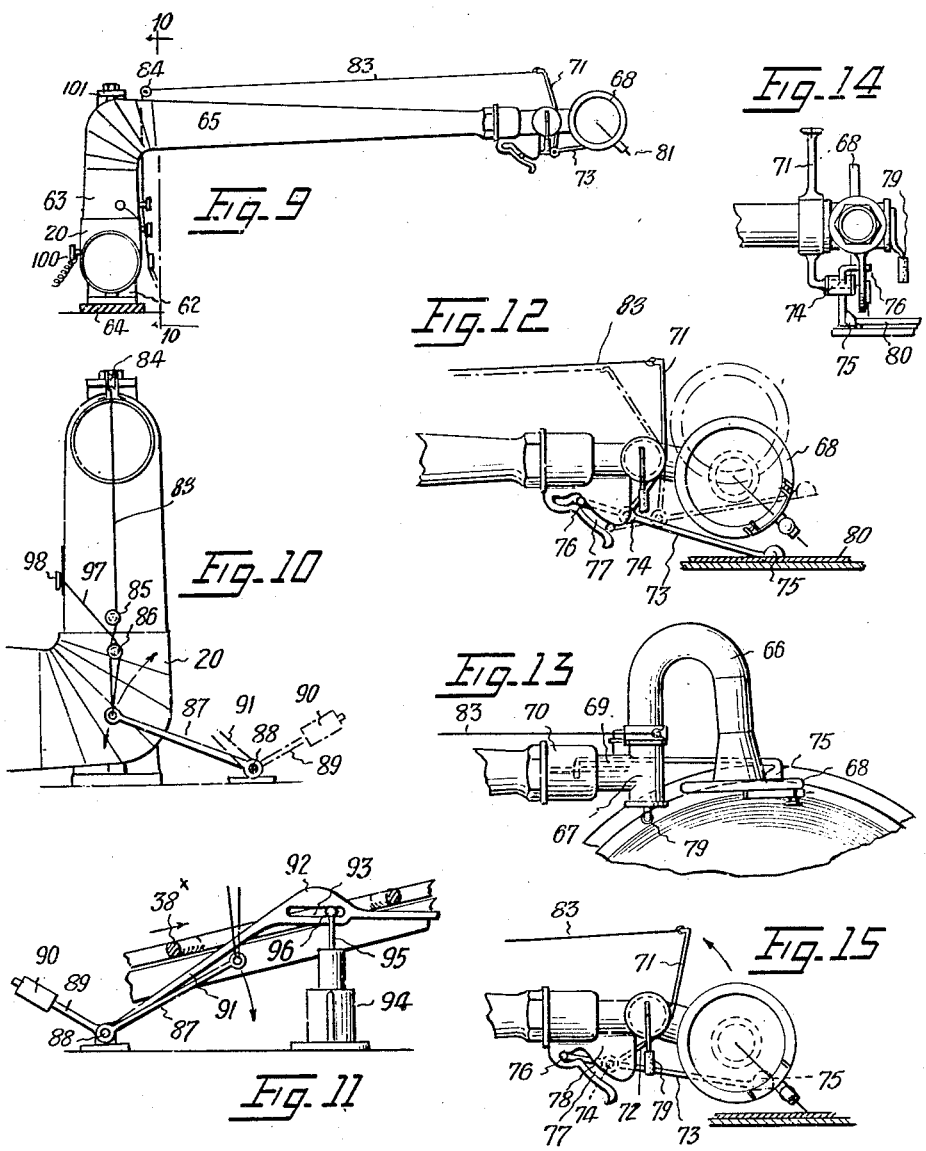

Patented Sept. 3, 1929.

1,727,263

UNITED STATES PATENT OFFICE.

EDGAR OSMOND YEAGER, OF CORAKI, AND ROBERT HAMILTON YORK, OF SWAN BAY, NEW SOUTH WALES, AUSTRALIA.

MULTIPLE-DISK-TYPE TALKING MACHINE.

Application filed April 24, 1925, Serial No. 25,702, and in Australia April 26, 1924.

This invention relates to talking machines fitted with means for bringing several records successively into playing position. In known machines of that type, the records are arranged in over-lapping order around a common centre and each record is brought to starting position in relation to the speaker when the preceding record has been played out. The records are carried on individual tables mounted for rotation on a common carrier, and this common carrier is rotatable on an axis to which endwise movement is imparted by its rotation in a helical support, whereby the record tables are successively brought to the playing level in operative relation to the reproducer.

The present invention consists in certain improvements in the beforementioned type of multiple record talking machines. The several record tables are mounted for rotation in bearings peripherally arranged around a rotatable carrier. The axes of the respective bearings are tilted in relation to the axis of the rotatable carrier in which those bearings are supported, and the axis of this rotatable carrier is disposed angularly to the horizontal and is not movable axially. The record tables respectively overlap and come to the playing position in operative relation to the reproducer, each one of them as it comes to this operative position being caused to assume a horizontal or a nearly horizontal position, all the other tables then occupying various angular positions. The angular displacement of the carrier in relation to horizontal is the same as the angular displacement of the record table bearings in relation to the carrier itself; hence at the playing position, the record tables come to horizontal position. Driving motion is applied only to the particular table which for the time being is in horizontal position and in operative relation to the reproducer. The drive is in practice applied to the edge of this table by a fast running flexible faced pinion which makes frictional contact with it; this pinion has speed control mechanism of a centrifugal type associated with it and it is driven by a clock spring or electric motor, preferably the latter. Optionally, drive to that table might be applied by other means, but it is preferred to use the edge drive pinion which has been proven a satisfactory device for driving record tables in single disk machines. The carrier on which the several tables are mounted may be a ring supported on anti-friction bearings, in which case the motor may be located centrally in relation to the group of tables, thus to economize space and offer a convenient mechanical arrangement; but the carrier might be a disk or spider frame mounted on a fixed axle post or a disk or spider frame having an axle working in a fixed bearing. In practice, a ring type of carrier frame is used with the record table spindles mounted in bearings formed at the ends of arms which project radially from the ring.

The carrier is rotated step by step by a spring motor which is wound up by rotating the carrier reversely, and means are provided for releasing a check upon the completion of the playing of each record so as to permit the carrier to be rotated by this motor one step thus to bring the next record in order to the playing position; and means are further provided for accurately determining the commencing and finishing positions of the needle contact with each record, thus to ensure a complete rendering of the record without overrunning the record blank spaces. Furthermore, means are provided for automatically lifting the reproducer off each record immediately playing of that record has been completed, and for bringing the reproducer automatically to the starting position above the next record in order as soon as it has come to the playing position and for setting it down on the record gently so that the needle will appropriately engage the first groove in the record.

Normally the machine would be used with the complete automatic control so that when loaded up with a number of records it will successively bring all these records into playing position and play each of them through with a pause intervening at each change. An accessory control device is, however, provided for enabling the starting and stopping of the machine from a distant point, and for enabling the stopping over of one or more of the records or the stopping of the playing of any one or more of the records and passing over to the next record in order.

In the accompanying drawings:—

Fig. 3 is a semi-diagrammatic enlarged fragmentary view showing a ring type of carrier in section, certain of the record tables mounted thereon and a centrally disposed driving motor for applying rotational movement to the record tables, also a spring motor for moving the ring carrier step by step to bring the tables successively to playing position;

Fig. 4 is a fragmentary sectional plan showing the ring frame, portion of the step-by-step spring motor, and portion of a record table with its spindle mounted for rotation on one of the offset arms on the ring carriers;

Fig. 5 is a fragmentary sectional elevation showing the driving mechanism by which the record tables are rotated when in playing position, and electro-magnetic stop mechanism for engaging the ring carrier and holding it as the carrier bearings which carry the record tables successively come to playing position;

Fig. 6 is a fragmentary view corresponding with Fig. 5, showing the electro-magnetic stop open to allow the carrier to perform a partial rotation to bring another record table to playing position;

Fig. 7 is a fragmentary elevational view showing the record table, which for the time being is in playing position with the cone pointed bottom end of its spindle resting on a ramp footstep, by means of which ramped footstep the table is caused to be retired downwardly to lower it when the electro-magnetic stop is released to allow the ring carrier to be moved;

Fig. 8 is a fragmentary view illustrating a caging device which prevents accidental displacement of the carrier ring in relation to the race on which it runs;

Fig. 9 is a side elevational view of the tone arm and the speaker and its mounting, showing also a portion of the trip device by which the reproducer is automatically lifted when the playing of a record has been completed;

Fig. 10 is a vertical section on the line 10—10 Fig. 9, looking in the direction of the arrow, Fig. 9;

Fig. 11 is a fragmentary detail view explanatory of a dash pot and cam and tappet arrangement, by means of which the lifting and replacing movement of the reproducer is controlled;

Fig. 12 is a fragmentary sectional elevational view on enlarged scale explanatory of the operation of the reproducer lifting and replacing mechanism, and of the means whereby the correct placing of the needle in the first groove of the record is effected;

Fig. 13 is a partial plan view corresponding with Fig. 12;

Fig. 14 is a fragmentary elevational view corresponding with Fig. 12 taken whilst the reproducer is in the lifted position; and Fig. 15 is a fragmentary elevational view corresponding with Fig. 12, but showing the alterated position of certain of the parts when the reproducer has been moved downward so that the needle engages the record grooves.

Figure 2:
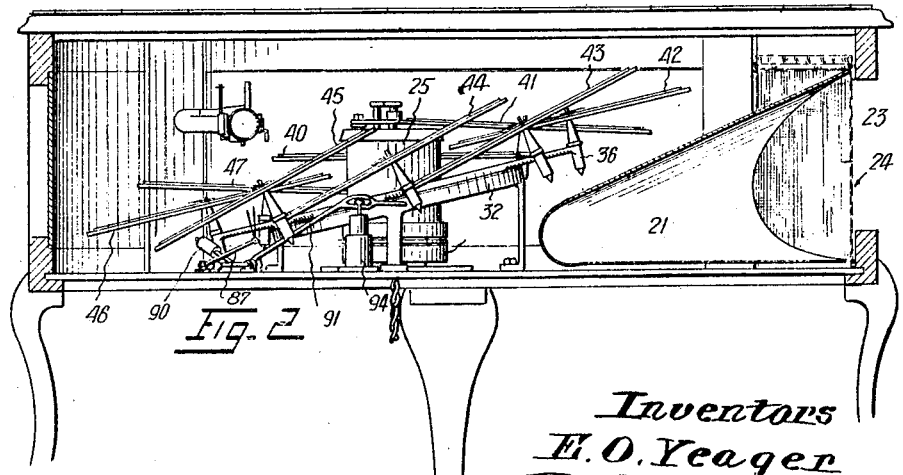
Fig. 2 is a semi-diagrammatic interior elevational view, a portion being shown in section. This view is taken on the line 2—2 Fig. 1.

In Figs. 2, 3, and 7 of these drawings the record tables are represented by parallel straight lines which are drawn through their transverse axes.

Figure 1:
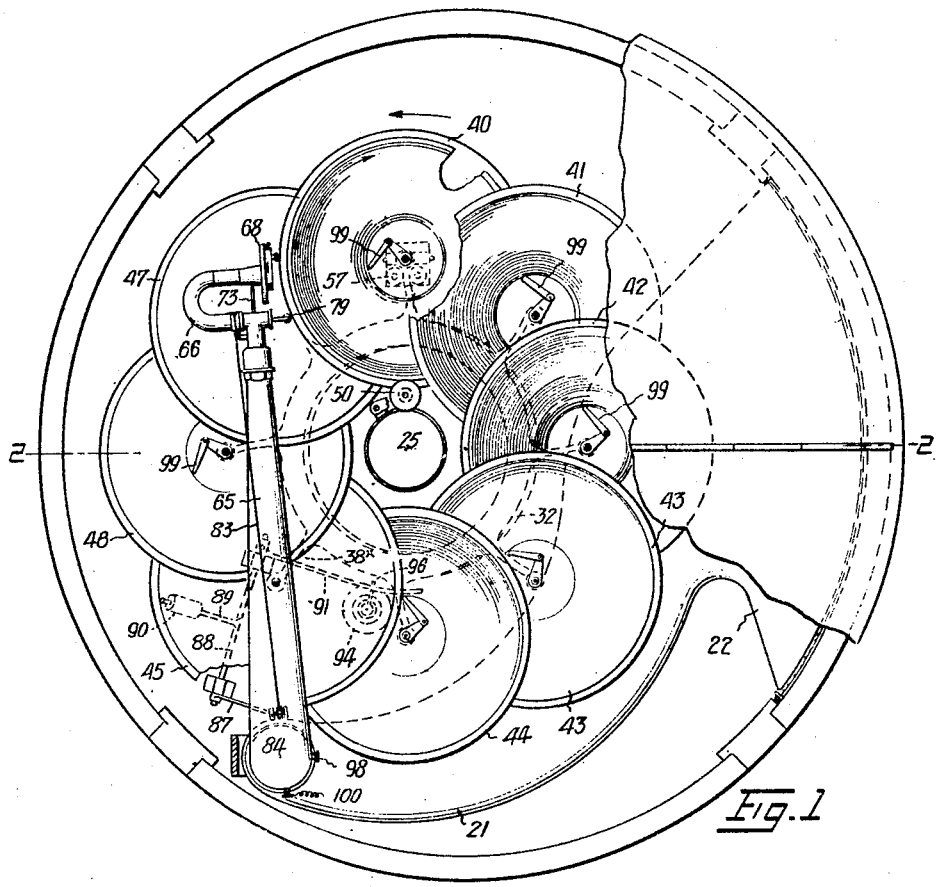
Fig. 1 is a plan view of an eight-table machine mounted in a circular cabinet, a portion of the top of the cabinet being shown; the cabinet top is hinged so that it may be opened to offer access to the mechanism.

Though the machine may be installed in any other type of cabinet appropriate to its shape and dimensions, it is preferred to install it in a cabinet of circular shape, such as shown in Figs. 1 and 2, the top of which may be utilized as a table. The tone arm tubular pillar 20 (see Figs. 9 and 10) is set up on the narrow end of the curved amplifier trumpet 21, the bell mouth 22 of which is brought out behind an open panel 23 in the side of the cabinet, the mouth being preferably covered with a silken or other fabric screen 24. 25 is a casing containing the electric motor; this motor is mounted on a fixed pillar 26 about the lower part of which a spring motor 27 is fitted. An arm 28 on the driven portion of the spring motor 27 carries a hand piece 30 which bears against a finger 31 which projects downward from the carrier ring 32. By rotating the carrier ring 32 manually in one direction the spring motor 27 is wound up, and the motor will then operate to rotate the carrier 32 in the opposite direction. The carrier 32 is permitted, however, to so move only intermittently, and it is controlled for that purpose by a stop 33 carried on the pivotal arm 34 of an electro-magnet 35. The stop 33 is in the path of the bearings 36 which carry the table spindles 37. These bearings 36 are formed on the ends of brackets 38 which project radially from the carrier 32 and are tilted angularly in relation to the plane of the carrier. The carrier 32 is rotatable on a ball race 39 which is tilted from the horizontal plane. The angle of the spindle bearings remains constant in relation to the plane of the carrier 32, but varies in relation to the horizantal plane, as the spindles are moved in a circular path by the rotation of the carrier. If the carrier 32 is inclined at an angle of 30° to the horizontal plane, and the bearings 36 are inclined at an angle of 60° to the plane of the carrier, each spindle in turn will be brought to a position where its axis is inclined at an angle of 90° to the horizontal plane. Resulting from the tilt of the carrier 32 and the tilt of the bearings 36, there is only one point in the rotation of the carrier 32 at which a table carried on it will come to a horizontal position. This inclination of the bearings is best shown in Figs. 2 and 3 and the vertical position of the bearings at one point of rotation of the carrier is best shown in Fig. 7, where the record table for the time being set horizontally is numbered 40. The other record tables in the order in which they come to the horizontal position are numbered respectively 41, 42, 43, 44, 45, 46, and 47. As each table in turn attains the horizontal or playing position 40 its edge makes frictional contact with the driving pinion 48; this pinion is a compressible rubber collar carried on a spindle 49 which is driven through a friction pinion 50 off the motor 25, 51 being a centrifugal braking arrangement of a type usual in machines of this class with a speed regulating screw 52 associated with it. By means of the nuts 53 the pinion 48 may be compressed to expand it to the necessary extent to ensure an effective frictional engagement with the edge of the table 40.

The bottom end of each of the table spindles 37 is cone pointed as shown at 54, and a collar 55 is formed on the upper part of the spindle to rest on the top end of the bearings 36. Except when the table is in playing position it is carried, together with the record on it, by the collar 55, but when it comes to the playing position the footstep cone point 54 is caused to ride on the ramp 56, which may be conveniently formed on the back part of the frame 57 which carries the electromagnet 35. It rests on the descending portion of the ramp 56 whilst the table is in playing position, being held at that place by the stop 33 against which the side of the bearing 36 presses. A quite solid footstep is thus assured to the table whilst it is in the playing position, and uniformity in the height of the table at the playing position is thus assured.

The electric motor 25 is driven from any appropriate source of current, 58 being a flexible circuit line through which the current is carried to it. In this line, which may be of any desired length, a switch (not shown) is fitted to enable a person at a distance to switch on and switch off the motor as required. 59 is a light flexible line connected to the stop 33; this line is extended to any distant position and may be operated manually from such position to release the stop 33 independently of the automatic operation of the electro-magnet 35. If a record is being played which is no longer desired, a person may by pulling the cord 59 release the stop 33, thus freeing the carrier 32 so that it will be rotated one or more steps by the spring motor 27 to bring the next or the following or any later record to the playing position. The automatic devices hereinafter described for controlling the setting of the reproducer and tone arm are operated by the same means and in the same way whether the stop 33 be actuated automatically through the electro-magnet 35 or through the manual pull cord 59. 60 is a wiring terminal of the electro-magnet 35. It is brought to a battery or other source of electric current; the other terminal of the magnet winding is through the frame, as hereinafter described. 61 is a light spring which may be used to hold the stop 33 in engaged position if the armature weight is insufficient for that purpose; this spring is so tensioned that it is fixed when the electro-magnet 35 is energized to lift the armature 34 to release the stop 33.

The tubular pillar 20 in which the tone arm neck piece 63 is rotatably mounted is electrically insulated from the frame structure of the machine, as for instance by a plate 64 of hard fibre or like insulator. If, however, a low tension battery current is used for operating the electro-magnet 35 it will suffice if the base 62 be fixed to any wooden portion of the structure which will offer sufficient resistance to leakage of the battery current. 65 is the tone arm; any usual form of rotatable tone-arm mounting fitting being used. The outer end of the tone arm carries the U-piece 66, one leg of which is rotatably mounted in the junction sleeve 67, whilst its other end carries the reproducer 68. The stem piece 69 of the junction sleeve 67 is fitted into the tone arm end piece 70 and secured by a junction latch or by any other convenient device which will hold it firmly. The U-shaped neck piece 66 which carries the reproducer and the method of mounting this U-piece in a junction fitted in the end of the tone arm discloses no feature of novelty. 71 is a lever which is fixed to the rotatable stem portion of the U-piece 66, and 72 is another lever fixed to the same part 66. 73 is a trip arm supported upon the bottom end of the lever 72 on a pivot 74. The forward end of the trip arm 73 is armed with a stop finger 75, and the rear end of it is armed with a laterally offset pin 76. The pin 76 works in a curved slot 77 in a plate 78 which is fixed to the end of the tone arm. 79 is a stop finger which depends from the junction sleeve 67. The check 79 operates to receive the impact of the edge of the table 41 as that table begins to move into the playing position. The finger 75 functions to contact with the periphery of the disk record 80 on the table 40 immediately prior to the movement hereinafter described in which the reproducer is lowered so as to bring the needle 81 down gently onto the starting position on the record.

From the top of the lever 71 a light flexible cord 83 is led back over the top of the tone arm and thence over an idler pulley 84; thence it passes down through the tone arm which is pierced with two small holes for this purpose, and it is then reeved over a button 85 on the neck 63 of the tone arm, thence reversely over a button 86 on the fixed base portion 20 in which the tone arm swings and is thence connected to a pull lever 87;

this lever is fixed to a rocking fulcrum spindle 88. A reversely offset arm 89 on the rocking spindle 88 carries a counterweight 90. The rock spindle 88 carries also another arm 91; this arm is located in the path of movement of the ring bracket arms which carry the table spindle bearings 36. The upper portion 92 of the arm 91 functions as a cam, and is slotted (93). 94 is an air dash pot of a known kind in which the air leak hole is arranged to allow evacuation of the air compressed in the pot suddenly after the plunger has reached a certain position in its slowed downward movement. The plunger rod 95 has an offset pin 96 on the top end of it and this pin runs in the slot 93. 97 is another flexible line, one end of which is connected to an adjustable screw 98 on the tone arm neck piece 63; this line is reeved over the button 86 and like the line 83 is connected to the pull end of the lever 87.

99 is an adjustable electrical contact making device consisting of a folding metal arm adapted to be set upon the centering pin which locates the records on the tables; one of these contact devices is set over each record so that the outer end of its arm is placed over the innermost groove of the record where it will be touched by the needle of the reproducer when the reproducer is finishing the last notes on the record. 100 is a battery terminal which is fixed on the pillar 20 of the tone arm 65. 101 is the top centre steadying pivot of the tone arm.

The spring motor 27 is a simple and convenient device for applying partial rotary movement to the ring 32, but it is obvious that other means might be provided for applying this rotary movement at the proper time, such means being driven by the motor 25 or by any other convenient means.

The operation is as follows:

A record is placed on each of the record tables and a contact device 99 adjusted on each of these records. The records are arranged serially so that they will come successively into play in the desired order, the direction of rotation of the system of record tables being as shown by the arrow in Fig. 1. The ring frame 32 is now turned reversely by hand so as to wind up the spring motor 27; this winding up is effected by the action of the finger 31 which presses against the handpiece 30 of the bracket 28. When a complete rotation has been made, the stop 33 which is latch shaped to allow the ring arms to snap past it in the winding up movement, is allowed to engage in front of the bearing 36 which carries the spindle 37 of the table 40 which occupies the level or playing position.

At this point the table 40 is brought into rotation by the frictional contact with it of the driving pinion 48. Thereafter the rotation of the table continues whilst the needle runs through the groove on the record, and playing proceeds in the ordinary way. As soon as the needle has traversed all the grooves it touches the end of the contact piece 99. When this contact occurs a circuit is established from the battery through the wire 100, through the tone arm, the needle, the contact piece 99, and the frame of the magnet to one terminal of the winding of the coil 35, and thence by the wire 60 back to battery. When this happens the armature 34 is attracted, the stop 33 is retired and the spring motor 27 acts to apply another partial rotation to the ring 32. Soon after this motion has commenced, one of the bracket arms 38 on the ring 32 comes into contact with the lever 91 and forces that lever downward. It is to be noted that the circuit is completed through the electro-magnet 35 only momentarily whilst the needle touches the contact device 99. As already described when that contact occurs, the ring frame 32 is freed and commences its rotation and the circuit is broken by loss of contact of the spindle 54 with the ramp 56. When the table 40 commences its descent to the 47 position (see Fig. 2) the contact of the needle with the contact piece 99 is also instantly lost. The current being thus interrupted the stop 33 is restored by its spring 61 or by the weight of its armature, and stands ready to check the rotational movement of the ring 32 when the next bracket bearing 36 in order comes to position against it.

The movement of the ring frame in the direction of the arrow to meet the stop 33 brings the edge of the table 41 into contact with the check 79. As the table 41 descends to the playing level 40 (the table spindle running on the down slope of the ramp 56) its engagement with the check 79 is soon lost, but in striking the check 79 it causes the tone arm 65 to swing away, in the direction of the arrow. As the table 41 is approaching the playing position at which it will be held by the stop 33, one of the brackets 38 of the ring 32 will run up the arm 91; this is seen in Fig. 11, where the arm about to run up this lever is marked 38×. As this arm runs up the lever 91 it forces it down against the resistance of the dash pot 94. Thus, the table 41 is slowed up in its movement towards the playing position 40 by dash pot action. The downward movement of the lever 91 effected in this action results in the moving down of the lever 87 and the tautening of the two cords 83 and 97. The tautening of the cord 97 causes the tone arm 65 to be swung gently away from the table 41 and the check 75 is then in alignment with the edge of that table. As the table finishes its movement, it lowers slightly consequent on the movement of the footstep 54 down the ramp 56, and the check 75 then slips over the table edge and engages the edge of the record. The length of the cord 83 is so adjusted that before this contact happens, the lever 71 will be pulled backward so as to tip up the reproducer 68 and bring the needle point above the surface of the record 80. As soon as the arm 38× has passed over the ramp 92 the lever 91 commences to rise, and its upward movement is slow under the dash pot control. When upward movement of the lever 91 takes place, the cord 83 is lowered so that the lever 71 comes forwardly (see Fig. 12). In so doing it moves back the arm 73 which carries the check 75, bringing the offset pin 76 on the back end of that arm up through the slot 77. When the pin 76 reaches the downwardly joggled portion near the top of the slot 77, the needle 81 is located immediately above the outer groove on the record 80. As the backward movement of the pin 76 continues into the joggled portion of the slot, the arm 73 is tipped upward suddenly, thus releasing the stop against the edge of the record 80 and permitting the needle to drop into the outermost groove on the record. Slightly before this point the dash pot free release action occurs, and the needle rests in the groove, and the cord 83 slackens to allow quite free movement of the tone arm. The slackening of the cord 97 operates to allow the tone arm freedom to come gently towards the record. The clearances have been shown a little exaggerated in the drawings for the purpose of making the action clearer.

Thereafter, the same cycle of operations is repeated as each record in order comes towards the playing position.

What we claim as our invention and desire to secure by Letters Patent is:—

1. A multiple disk talking machine including a carrier ring mounted for rotation in an angularly disposed fixed plane, a plurality of bearings symmetrically disposed on said carrier ring with their respective axes in such angular relation to it that at one point only in its rotation will each of such bearings come to a playing position, a plurality of record tables, having their respective spindles mounted for rotation in said bearings, a tone arm carrying a reproducer on its free end thereof, means for bringing the reproducer into operative relation to a record on the table which is for the time being horizontally positioned, means for retiring the reproducer from said record, means for applying rotational movement to said tables when they are horizontally positioned, and means for rotating the carrier to progress the tables successively to the playing position.

2. In a multiple disk talking machine according to claim 1, rotatable tables fitted with cone foot spindles mounted in carrier bearings, and a fixed footstep for lifting and supporting each of said spindles successively during rotation of the table carried thereon.

3. In a multiple disk talking machine according to claim 1, a driving pinion frictionally engageable with the table which is at the playing position, a revoluble member adapted for applying movement to the carrier ring, a stop for holding said ring, and means for momentarily retiring said stop to permit step by step movement of said ring.

4. In a multiple disk talking machine according to claim 1, means for procuring step by step movement of the carrier ring, said means including a motor under constant torque, a stop adapted to arrest movement of said ring, means for momentarily retiring said stop at predetermined intervals, and projecting members on the carrier ring adapted to engage said stop to locate the table successively in operative relation to the reproducer.

5. In a multiple disk talking machine according to claim 1, a motor driven carrier ring, a motor driven pinion for revolving the record tables, a stop for arresting movement of said ring, and distant control means for releasing said stop and for starting and stopping the table driving motor.

6. In a multiple disk talking machine according to claim 1, a counterbalanced cam lever, tappet members on the carrier ring in operative relation to said lever, and a flexible line controlled by said lever and connected to the reproducer to lift said reproducer during the ring movement and to lower it after said movement is arrested.

7. In a multiple disk talking machine according to claim 1, means for lifting and lowering the reproducer and for positioning the needle at the starting point of a record, said means comprising projecting elements on the carrier ring, a lever movable by said elements, two flexible lines connected to said lever, one of said lines adapted to tilt the reproducer upwards when the playing of a record is completed, and to lower it on to the next succeeding record, and the other line being adapted to swing the tone arm away from the record which is approaching the playing position and to steady its return swing when the said record has reached playing position.

8. In a multiple disk talking machine according to claim 1, a locating arm pivotally hung on the reproducer, a finger on said arm adapted to locate the reproducer in relation to the record table, a cam on the tone arm, a tappet on the locating arm coacting with said cam and adapted to tilt the locating arm clear of the record table when the reproducer needle touches the record.

9. In a multiple disk talking machine according to claim 1, a rotating carrier ring, a latch stop for holding said ring, an electromagnet for releasing said latch stop momentarily to permit step by step movement of said ring, a battery circuit to the winding of said electro-magnet, and an adjustable contact device mounted on the centre spindle of each record table for closing said circuit when the reproducer needle reaches the finishing point of the record.

10. A multiple disk talking machine including a carrier ring rotatable in a plane disposed at an angle to the horizontal, overlapping record-carrying tables, an axle spindle for each table, bearings for said spindles symmetrically spaced on the carrier ring and disposed at an angle to the plane of said ring, the angular relation of the spindle bearings and the plane of rotation of the carrier ring being such that the tables are successively brought to horizontal position in operative relation to the reproducer, means for lifting the reproducer from each record at the finishing point thereof, for swinging the reproducer clear to accommodate the incoming movement of the succeeding record table and for thereafter lowering the reproducer on to the last mentioned record table with the reproducer needle located at the starting point of the record.

In testimony whereof we affix our signatures.

EDGAR OSMOND YEAGER.
ROBERT HAMILTON YORK.